(12) United States Patent
Nagata

(10) Patent No.: US 6,540,611 B1
(45) Date of Patent: Apr. 1, 2003

(54) PORTABLE GAME MACHINE AND GAME-ADVANCING METHOD

(75) Inventor: Akihiko Nagata, Tokyo (JP)

(73) Assignee: Konami Co., Ltd. (JP)

( * ) Notice: Subject to any disclaimer, the term of this patent is extended or adjusted under 35 U.S.C. 154(b) by 0 days.

(21) Appl. No.: 09/587,762

(22) Filed: Jun. 6, 2000

(30) Foreign Application Priority Data

Jun. 10, 1999 (JP) .......................................... 11-164524

(51) Int. Cl.[7] .................................................. A63F 13/00
(52) U.S. Cl. .............................. 463/31; 463/1; 463/43; 463/46
(58) Field of Search ........................... 463/1–8, 30, 31, 463/40–44, 46, 47

(56) References Cited

U.S. PATENT DOCUMENTS

| | | | |
|---|---|---|---|
| 4,491,324 A | * | 1/1985 | Yoshida |
| 5,184,830 A | * | 2/1993 | Okada et al. |
| 5,580,308 A | * | 12/1996 | Nakamura |

FOREIGN PATENT DOCUMENTS

| | | |
|---|---|---|
| CA | 318226 | 10/1986 |
| DE | 29710637 | 6/1997 |
| DE | 29713965 | 8/1997 |
| EP | 933724 | * 8/1999 |

OTHER PUBLICATIONS

Harrington, *Macintosh Assembly Language An Introduction*, 1996.*
Mathews, *Assembly Language Primer for the Macintosh*, 1985.*
Weston, *The Complete Book of Macintosh Assembly Language Programming Vol. II*, 1987.*
Published Register Utility Model No. 3046047, entitled Portable Game Device, issued Feb. 20, 1998.
Patent Abstracts of Japan Publication No. 11–08500, entitled Portable Electronic Apparatus Device, By Akihiro Yokoi, issued Mar. 30, 1999.
GameBoy, Bionic Commando, Tetris, and Pokemon, 1987–1999.*

* cited by examiner

*Primary Examiner*—Michael O'Neill
(74) *Attorney, Agent, or Firm*—Bachman & LaPointe, P.C.

(57) ABSTRACT

A portable game machine has an input unit and a display which are accommodated in a portable housing. Gauges are composed of a plurality of small areas sequentially arranged in predetermined directions. In the housing, a game processor is provided which selects one of a plurality of preset game elements based on an operation input by a game player and which displays information on game progress on at least one of the gauges.

8 Claims, 4 Drawing Sheets

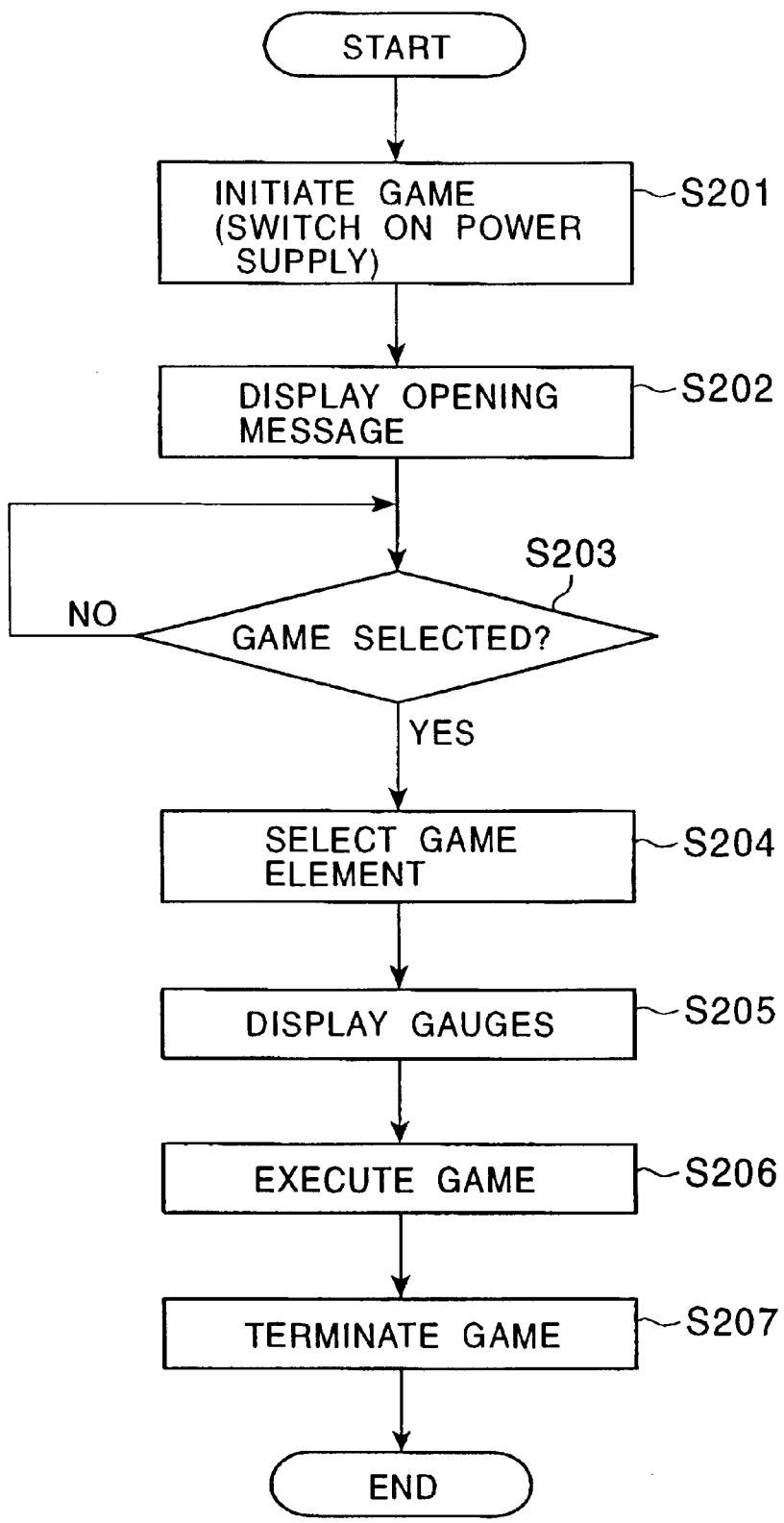

PORTABLE GAME MACHINE AND GAME-ADVANCING METHOD

BACKGROUND OF THE INVENTION

1. Field of the Invention

The present invention relates to portable game machines, and in particular, to a portable game machine called a "key-chain game", which is small enough to be attached to a key holder.

2. Description of the Related Art

Due to the progress of technology, it is easy to reduce the size of game machines having a built-in electronic circuit. In particular, game machines that include an input unit operated by a game player, a game processor for executing game processing based on operations input by the input unit, and a display for displaying the result of the executed processing have come into widespread use because of their portability, a convenient feature allowing the game player to easily play the game regardless of the time and place, and their low price.

Currently, too many types of portable game machines on the market cause "excessive competition". Therefore, it is essential to develop a type of portable game machine which can be differentiated from other types and which provides a highly entertaining game.

Portable game machines have the merits of small size and low price and it is difficult to realize a highly entertaining portable game machine in which these merits are maintained. In particular, among portable game machines, in the type of game machine called "key-chain game", it is common to use a known type of microchip to constitute the hardware including a storage unit and a central processing unit (CPU). This limitation makes It difficult to develop a highly entertaining game machine.

SUMMARY OF THE INVENTION

Accordingly, it is an object of the present invention to provide a portable game machine which uses known hardware yet which provides a highly entertaining game without requiring a large storage capacity.

It is another object of the present invention to provide a game-advancing method adapted for the execution of the above-described game in such a portable game machine that electronically enables the above-described game.

To these ends, according to an aspect of the present invention, the foregoing objects are achieved through provision of a portable game machine including an input unit operated by a game player, a game processor for executing game processing based on an operation input from the input unit, a display for displaying the result of the processing executed by the game processor, and a portable housing for accommodating the input unit, the game processor, and the display. The display displays a plurality of gauges composed of a plurality of small areas sequentially arranged in predetermined directions. The game processor selects one game element from among a plurality of preset game elements based on the operation input from the input unit, and displays information on the progress of a game on at least one of the gauges when any one of the game elements is selected.

According to a portable game machine of the present invention, from a plurality of game elements, one game element can be selected, which enables a game player to play a plurality of games. Therefore, the portable game machine can prevent the game player from getting tired of the game. In this specification, the game elements means elements required to execute one game. For example, the game elements include image data relating to images to be displayed on a display during the game, and data relating to rules for the progress of the game. The portable game machine displays, on the display, a plurality of gauges for indicating the progress of the game. Accordingly, the portable game machine enables the game player to recognize a plurality of types of information relating to the progress of the game, such as timing the game player operates an input unit, a remaining time in which the game player is allowed to perform operations, and the state of a game character displayed on the display. This makes it possible to create a variety of games and to greatly entertain the game player.

In the portable game machine, the plurality of gauges are used in common for a plurality of games. Accordingly, although various games can be created, the development of games using a conventional type of microchip is facilitated without requiring large-capacity storage.

Preferably, the gauges are displayed by sequentially arranging small areas in predetermined directions. For example, by circularly arranging the small areas, the gauges can be formed. Also, by sequentially the small areas in a line, the gauges can be formed.

In particular, it is preferable to employ an arrangement in which the display has a substantially rectangular display screen and the gauges are displayed along sides of the display because the arrangement avoids the interference between an original game picture that includes a game character and a background, and the gauges.

The number of gauges must be plural, but there is no particular limit in the number. Nevertheless, it is preferable to provide about two gauges when considering limitation in which the game player can view and can efficiently obtain information, and a limit in the processing performance of known hardware.

There is no particular limitation to the type of display if it can display images. For example, a dot-matrix liquid-crystal display may be used. In this case, the small areas can be displayed using a corresponding dot constituting the display. By using the one corresponding dot for each small area, the amount of data required for displaying the gauges can be reduced.

According to another aspect of the present invention, the foregoing objects are achieved through provision of a method for use in a portable game machine including an input unit operated by a game player, a game processor for executing game processing based on an operation input from said input unit, a display for displaying the result of the processing executed by said game processor, and a portable housing for accommodating said input unit, said game processor, and said display. The method includes the steps of selecting one game element from among a plurality of preset game elements based on the operation input from said input unit, and displaying a plurality of gauges composed of small areas sequentially arranged in predetermined directions on said display, and simultaneously displaying predetermined information on the progress of a game at least on one of the gauges.

According to the present invention, as can be clear from the foregoing embodiments, a highly entertaining game, which prevents a game player from getting tired of the game, can be selected from among a plurality of types of games, and can be executed, even although conventional hardware is used with it unchanged.

Therefore, the present invention enables easy development of a game differentiating from other types of portable game machines without causing a storage unit included in conventional hardware to have an excessive load. In addition, according to a game-advancing method of the present invention, each of a plurality of games can easily be executed, with entertaining characteristics of the game maintained.

BRIEF DESCRIPTION OF THE DRAWINGS

FIG. 4 is a flowchart showing the progress of a game executed by the portable game machine shown in FIG. 1.

DESCRIPTION OF THE PREFERRED EMBODIMENTS

With reference to the accompanying drawings, a type of portable game machine according to a preferred embodiment of the present invention is described below. By describing the operation of the game machine, a game-advancing method applicable to portable game machines of this type is also described.

Figure 1:
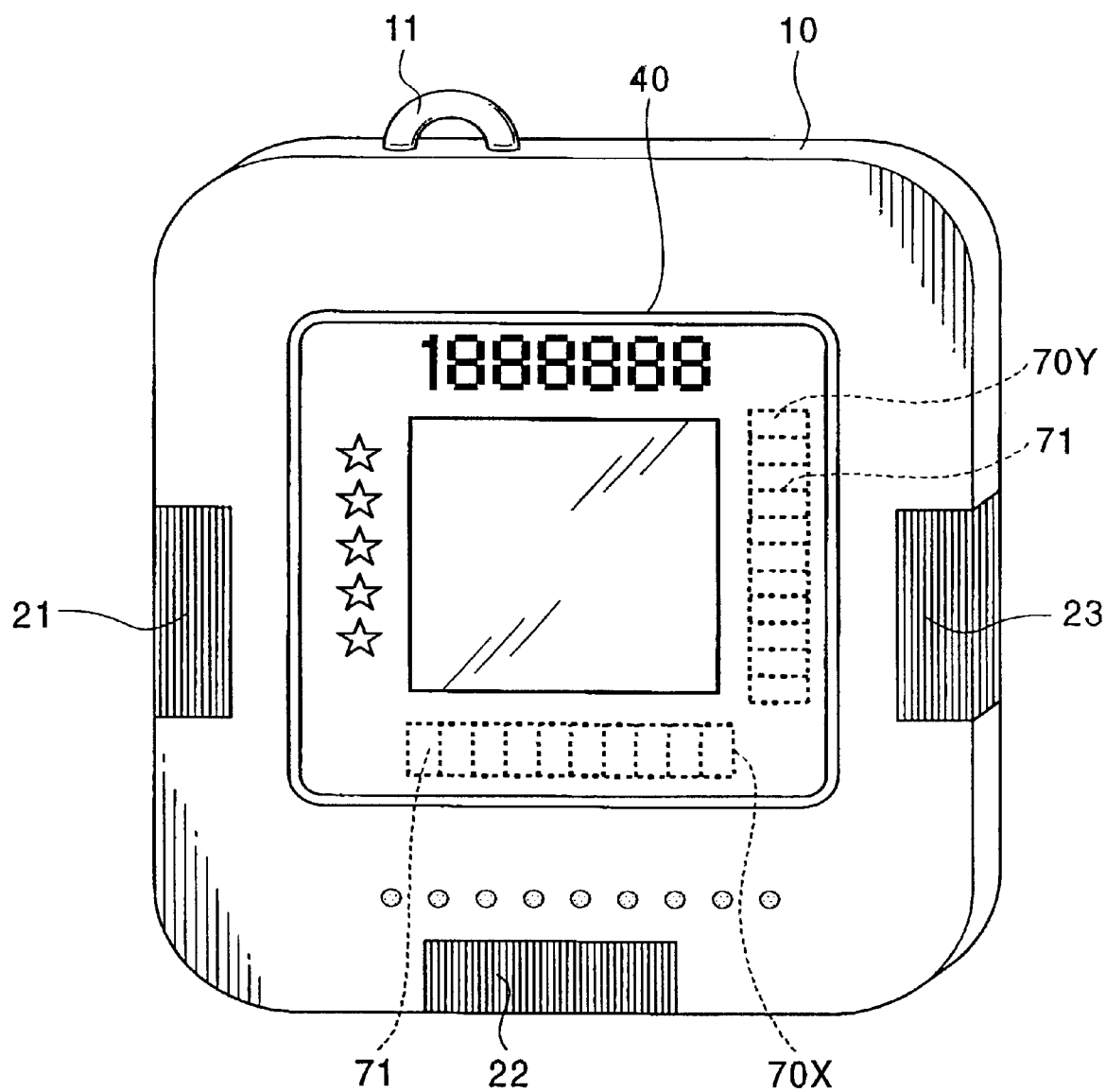
FIG. 1 is a perspective view showing the exterior of a portable game machine according to an embodiment of the present invention.

Referring to FIG. 1, the portable game machine has an input unit 20 (see FIG. 2), a speaker 30 (see FIG. 3), and a display 40, which are provided a housing 10. The housing 10 is formed so that it can be held in a hand, and also includes a game processor 50 (not shown) described later. At the top of the housing 10, a semicircular hook 11 is provided which is connected to a chain or the like of a key holder.

The input unit 20 includes three operation keys 21, 22, and 23 provided on two sides and the bottom of the housing 10. The display 40 is, for example, a dot-matrix liquid-crystal display and has a substantially rectangular display screen.

Figure 2:
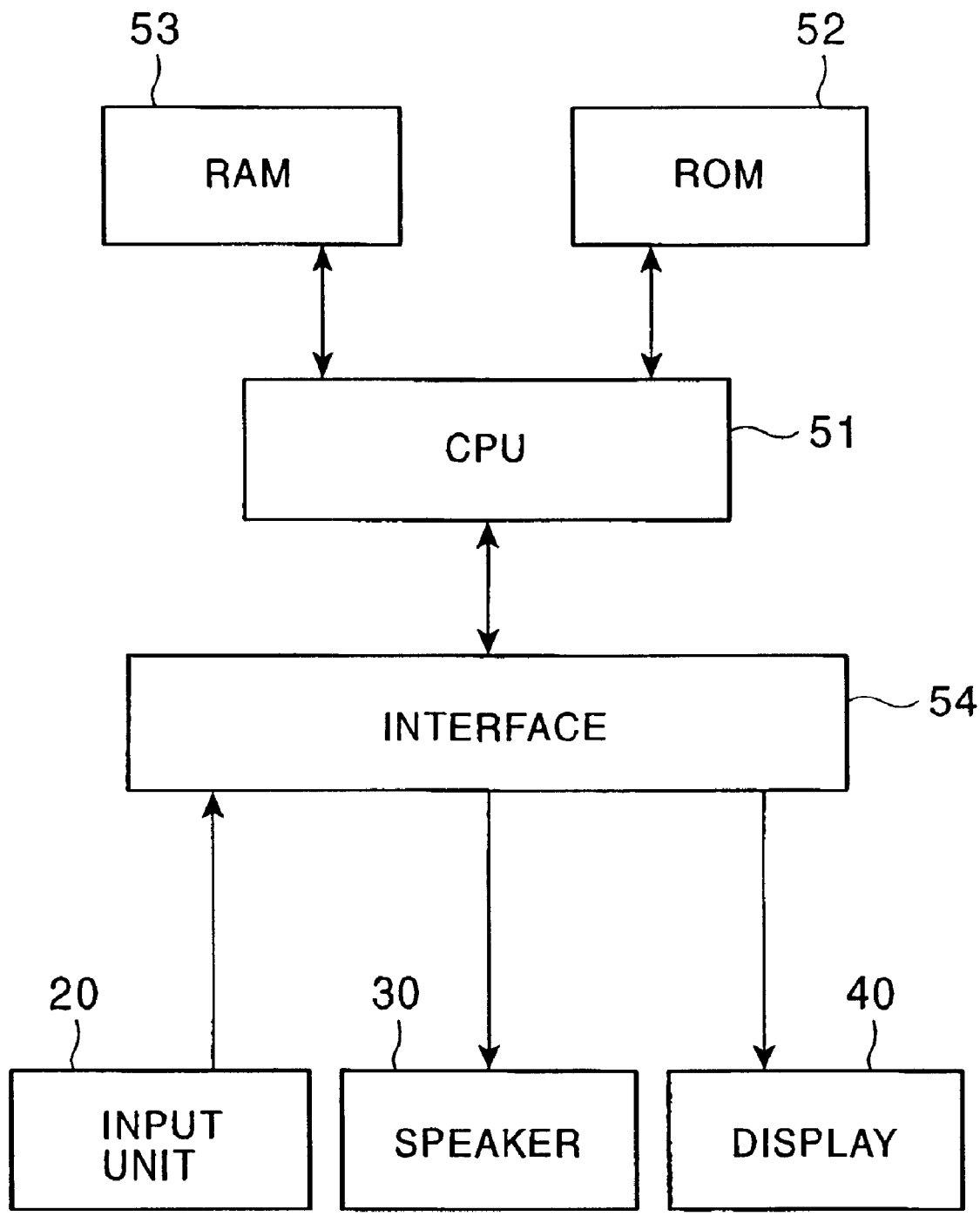
FIG. 2 is a block diagram showing the internal structure of the portable game machine shown in FIG. 1.

The internal structure of the portable game machine is as shown in FIG. 2.

The portable game machine includes a CPU 51, a read only memory (ROM) 52, a random access memory (RAM) 53, and an interface 54. The ROM 52, the RAM 53, and the interface 54 are connected to the CPU 51. The CPU 51 controls the entirety of the portable game machine. The storage unit 52, preferably ROM, stores program codes for operating the CPU 51, rules of games that can be executed by the game machine, and image data of the games.

The dynamic storage unit 54, preferably RAM, provides a work area required for the CPU 51 to perform data processing. The interface 54 functions as an input/output connection circuit for the CPU 51. Accordingly, the input unit 20, the speaker 30, and the display 40 are connected to the CPU 51 via the interface 54. Operation information generated by operating the input unit 20 is input to the CPU 51 via the interface 54. Image information to be displayed on the display 40 and audio information to be output from the speaker 30 are output to the display 40 and the speaker 30 via the interface 54, respectively.

Figure 3:
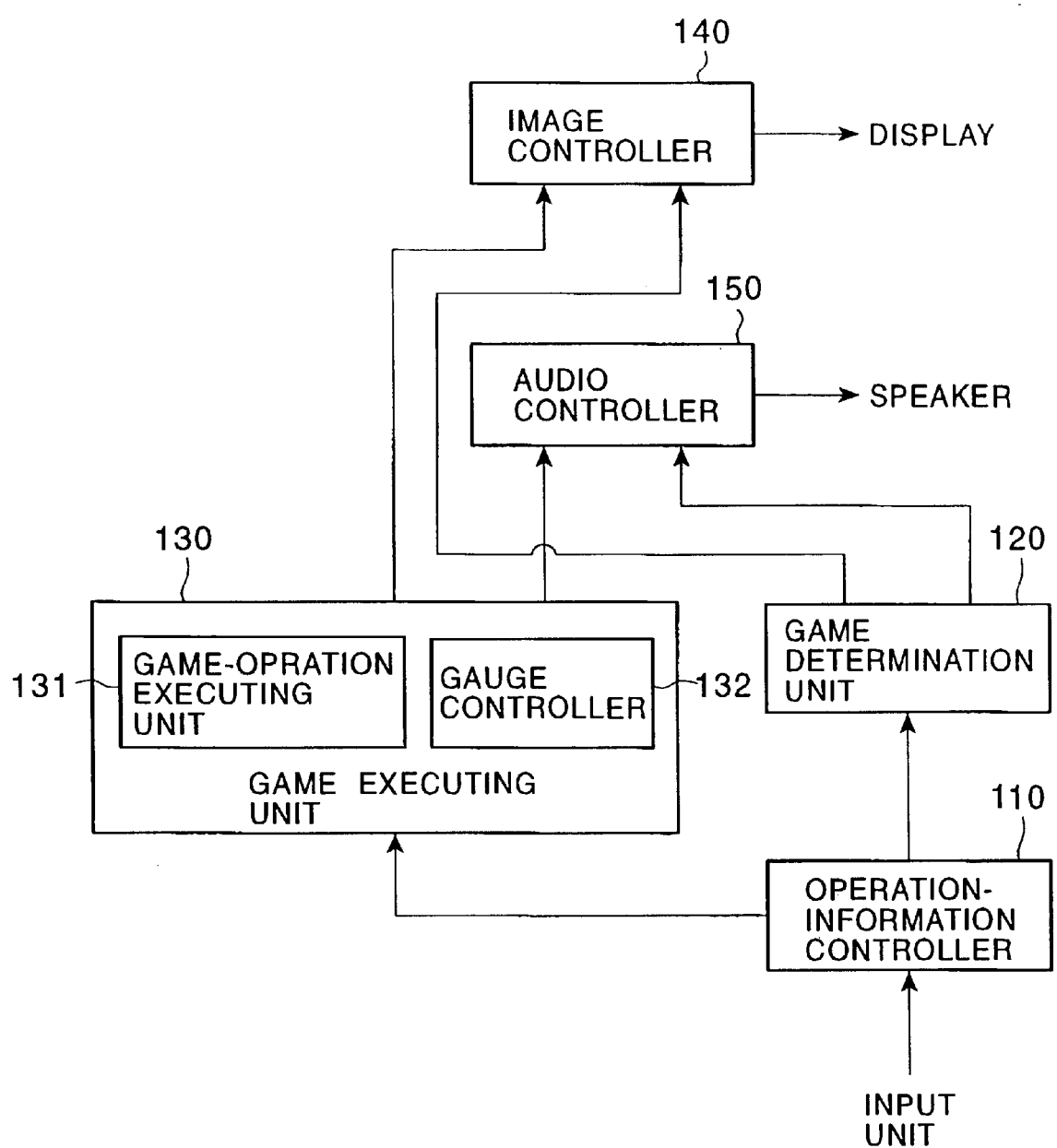
FIG. 3 is a block diagram showing functional blocks generated in the portable game machine shown in FIG. 1.

In the portable game machine, when main power is supplied, the CPU 51 reads the program codes or the like stored in the ROM 52, and generates the functional blocks shown in FIG. 3, that is, an operation-information controller 110, a game determination unit 120, a game executing unit 130, an image controller 140, and an audio controller 150. These functional blocks constitute the game processor 50.

The operation-information controller 110 decodes the operation information input from the input unit 20 via the interface 54, and transmits the operation information to the game determination unit 120 and the game executing unit 130.

The game determination unit 120 determines which one of a number of preset games is requested to be executed. The game determination unit 120 sets the game requested to be executed, thereby enabling a game element for the set game to be usable.

Based on the game element determined by the game determination unit 120 and the operation information input from the input unit 20, the game executing unit 130 controls the execution of the game and images and sounds to be output. The game executing unit 130 also has functions of a game-operation executing unit 131 and a gauge controller 132. The game-operation executing unit 131 controls the progress of the game, and the gauge controller 132 controls gauges 70X and 70Y (described later) displayed on the display 40.

The image controller 140 controls image information on an image finally displayed on the display 40. The audio controller 150 controls audio information finally output from the speaker 30.

The game is executed in accordance with the flow shown in FIG. 4.

When the power supply is switched on to initiate the game (step S201), an opening message is displayed on the display 40 (step S202). At this time, the game player selects the desired game to play by operating the input unit 20. If nothing is input from the input unit 20 in a predetermined time, the opening message is repeatedly displayed. If the desired game to be played is selected by the game player ("Yes" in step S203), the game determination unit 120 prepares to execute the selected game, and selects a game element requested to be executed so that the game element can be used (step S204).

In step S205, the display 40 displays an image relating to the game content and horizontal and vertical gauges 70X and 70Y along two sides of the display screen (See FIG. 1). As shown in FIG. 1, the gauges 70X and 70Y are formed by sequentially arranging a plurality of small areas 71 in a line, and are displayed along two adjacent sides of the display screen. The displayed small areas 71 correspond to dots constituting the liquid crystal display 40. The gauges 70X and 70Y can be displayed by freely using more small areas 71. The gauges 70X and 70Y can be displayed on one display 40, as described in this embodiment; however, a separate small display for displaying only the gauges 70X and 70Y, as the display 40, may be provided.

When the game player inputs operation information for initiating the game, the selected game is executed (step S206). When the game is initiated, information on the progress of the game is displayed on at least one of the gauges 70X and 70Y on the display 40. By way of example, for using the gauges 70X and 70Y to display the remaining time of the game, for which a time limit is set, the gauges 70X and 70Y may be displayed by initially displaying all the small areas 71 in black, and sequentially displaying each of them, from one end, in the inverse color of white every three seconds.

As another example, when using the gauges 70X and 70Y as timing gauges, the display of the gauges 70X and 70Y may be controlled by, for example, Initially displaying all the small areas 71 in white, sequentially displaying each of them in the inverse color of black, and displaying all the small areas 71 in white at the time all the small areas 71 are in black. In this case, by setting the game, the game player can obtain information on the game to achieve an advantage. In the setting, when the black part of the small areas 71 is larger, the game player needs to operate the input unit 20. In addition, in a type of game in which a game character fights against another game character, the remaining life power of one game character can be displayed by initially displaying all the small areas 71 in black, and sequentially displaying each of the small areas 71 in the inverse color of white from one end. Accordingly, a decrease in the life power of one game character which is related to the number of small areas 71 in black can be displayed. By using the gauges 70X and 70Y, as described above, the current condition of the game character displayed on the display 40 can be displayed.

The progress of the game after initiating the game is controlled by the game-operation executing unit 131, and the gauges 70X and 70Y used after initiating the game are controlled by the gauge controller 132. The gauges 70X and 70Y do not need to be used in all types of games. When the gauges 70X and 70Y are not used in a game, they are simply displayed without being used.

When the game is finished, the score is displayed and the game processing is terminated (step S207).

What is claimed is:

1. A portable game machine comprising:
   an input unit operated by a game player;
   a display;
   a game processor for displaying a plurality of gauges composed of a plurality of small areas sequentially arranged in predetermined directions on the display, at least one gauge arranged horizontally and at least one gauge arranged vertically, selecting one game from among a plurality of preset games according to an operation input from the input unit, executing game processing of the selected one game, displaying a result of the game processing on the display, and simultaneously displaying given information on the progress of the selected game on at least one of the gauges;
   a storage unit for storing said plurality of preset games;
   a dynamic storage unit accessible to said game processor; and
   a portable housing for accommodating the input unit, the display, the storage unit, the dynamic storage unit and the game processor;
   wherein:
      the plurality of gauges are used in common for the plurality of preset games and are displayed on the display so as to correspond to different uses.

2. A portable game machine according to claim 1, wherein the plurality of gauges are formed by sequentially arranging the small areas in line.

3. A portable game machine according to claim 2, wherein:
   the display has a substantially rectangular display surface; and the gauges are displayed along sides of the display surface.

4. A portable game machine according to claim 1, wherein the gauges are displayed on the display so as to correspond to different uses.

5. A portable game machine according to claim 1, wherein:
   the display is a dot-matrix liquid-crystal display; and
   each of the small areas is formed by a corresponding dot constituting the screen of the display.

6. A portable game machine according to claim 4, wherein:
   the display is a dot-matrix liquid-crystal display; and
   each of the small areas is formed by a corresponding dot constituting the screen of the display.

7. A method for use in a portable game machine comprising an input unit operated by a game player and a display, the method comprising the steps of:
   displaying a plurality of gauges composed of a plurality of small areas sequentially arranged in predetermined directions on the display, at least one gauge arranged horizontally and at least one gauge arranged vertically;
   selecting one game from among a plurality of present games according to an operation input from the input unit;
   executing game processing of the selected one game; and
   displaying a result of the game processing on the display and simultaneously displaying information on the progress of the selected game on at least one of the gauges;
   wherein:
      the plurality of gauges are used in common for the plurality of preset games and are displayed on the display so as to correspond to different uses.

8. A portable game machine comprising:
   an input unit operated by a game player;
   a display;
   a game processor for displaying a plurality of gauges composed of a plurality of small areas sequentially arranged in predetermined directions on the display, at least one gauge arranged horizontally and at least one gauge arranged vertically, selecting one game from among a plurality of preset games according to an operation input from the input unit, executing game processing of the selected one game, displaying a result of the game processing on the display, and simultaneously displaying given information on the progress of the selected game on at least one of the gauges wherein the display has a substantially rectangular display surface; and the gauges are displayed along sides of the display surface, and wherein the gauges are displayed on the display so as to correspond to different uses;
   a storage unit for storing said plurality of preset games;
   a dynamic storage unit accessible to said game processor; and
   a portable housing for accommodating the input unit, the display and the game processor;
   wherein:
      the plurality of gauges are used in common for the plurality of preset games and are displayed on the display so as to correspond to different uses.

* * * * *